United States Patent [19]

Asai

[11] 4,317,511

[45] Mar. 2, 1982

[54] OVERLOAD RELEASE CLUTCH

[75] Inventor: Tatushi Asai, Nagoya, Japan

[73] Assignee: Brother Kogyo Kabushiki Kaisha, Nagoya, Japan

[21] Appl. No.: 129,981

[22] Filed: Mar. 11, 1980

[30] Foreign Application Priority Data

Mar. 26, 1979 [JP] Japan .................................. 54-36131

[51] Int. Cl.³ ............................................ F16D 43/20
[52] U.S. Cl. .................................... 192/56 R; 64/29; 192/48.92
[58] Field of Search ................... 192/56 R, 150, 48.92; 64/28 R, 29

[56] References Cited

U.S. PATENT DOCUMENTS

| | | | |
|---|---|---|---|
| 3,185,275 | 5/1965 | Orwin ................................ | 192/56 R |
| 3,270,844 | 9/1966 | Orwin ................................ | 192/56 R |
| 3,429,407 | 2/1969 | Orwin et al. ....................... | 192/56 R |
| 4,007,818 | 2/1977 | Orwin ................................ | 192/56 R |

FOREIGN PATENT DOCUMENTS 1111340 4/1968 United Kingdom .

*Primary Examiner*—Rodney H. Bonck
*Attorney, Agent, or Firm*—Browdy and Neimark

[57] ABSTRACT

An overload release clutch including a driving clutch member and a driven clutch member, for transmitting a torque from the former to the latter and suspending the torque transmission in the event more than a predetermined load is applied to the driven clutch member, by automatically disconnecting the two clutch members. A plurality of torque transmitting balls, interposed between both clutch members and received in respective ball receiving openings formed in the opposing inside surfaces of the clutch members, are moved out of the openings upon application of an overload, along a plurality of ball guiding slots formed which are in either one of the clutch members, extending in a slightly vertical shape from one end thereof communicating with each of the opening to the other end thereof so that the distance thereof from the axis of the clutch members are gradually changed. On the other clutch member a rotatable member of annular shape is fittingly disposed in an annular groove formed therein at a radial position confronting the other end of the slot so that it is able to rotate under pressure integrally with the ball which has been moved thereon without sliding friction, while the driven clutch member is restricted from rotary movement upon application thereto of any excessive torque.

9 Claims, 5 Drawing Figures

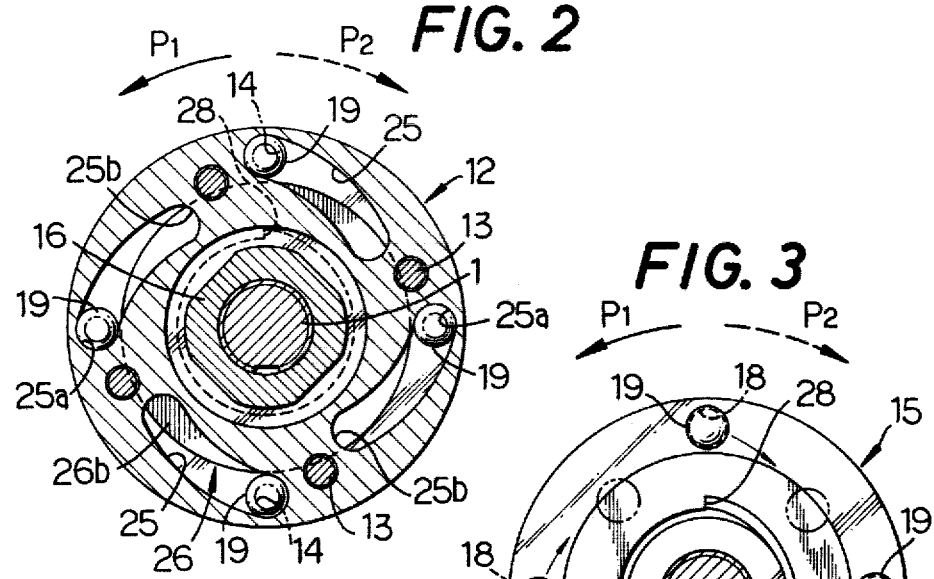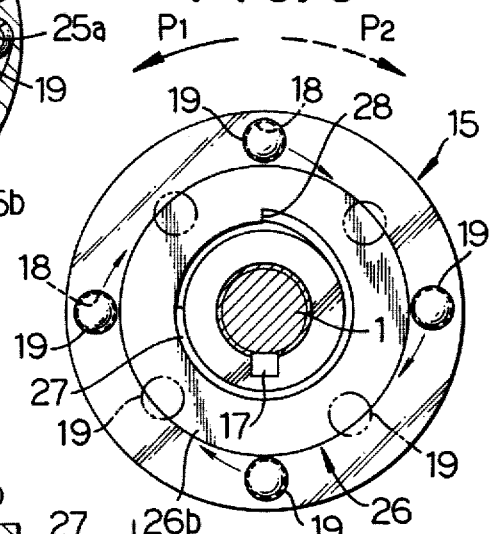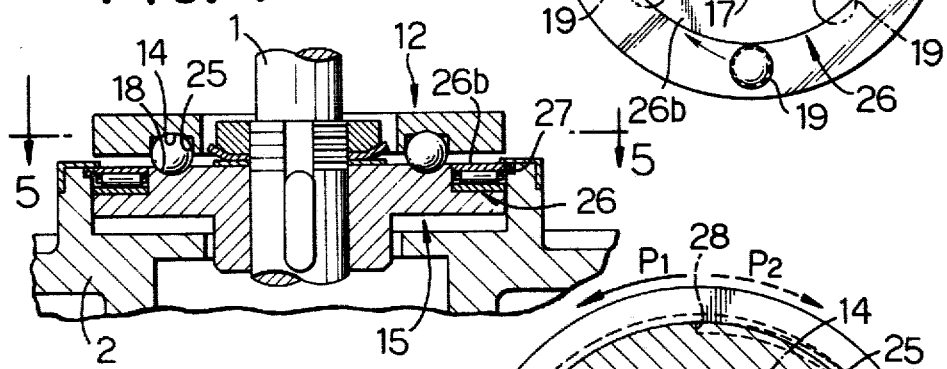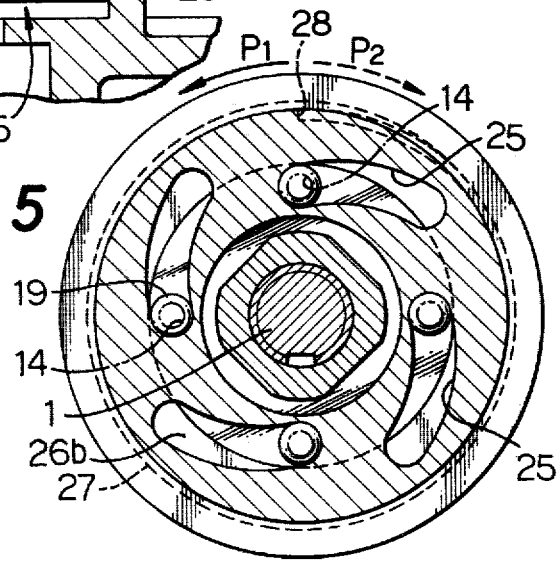

OVERLOAD RELEASE CLUTCH

FIELD OF THE INVENTION

This invention relates to an overload release clutch, disposed in a torque transmitting apparatus, to obtain automatic disconnection when more than a predetermined load is applied to the driven member.

BACKGROUND OF THE INVENTION

A well known overload release clutch of this kind, is disclosed in the British Pat. No. 1,111,340. This prior art clutch consists of a driving clutch member, a driven clutch member, a plurality of torque transmitting balls interposed between the mutually opposing surfaces of both members, a plurality of recesses or openings formed in the mutually opposing surfaces for carrying the torque transmitting balls, and a plurality of ball guiding slots or grooves formed in either one of the mutually opposing surfaces of both clutch members.

In an overload release clutch of this type, a torque is normally transmitted from one clutch member to the other by rotation of both clutch members connected together, with the torque transmitting balls engaging the recesses (openings) under the action of biasing means. When the driven clutch member is subjected to an excessive load beyond a predetermined value, the torque transmission between the two members is suspended, because the torque transmitting balls are moved along the respective ball guiding slots and finally move out of the recesses.

In the event the torque transmitting balls have moved out of the recesses due to application of an unusually large load on the driven clutch member, the balls are obliged to engage the surface of the other clutch member with no ball guiding grooves. This causes a relative movement between the torque transmitting balls and the surface of the other clutch member, since the driving clutch member alone is rotated while the driven clutch member is restrained from movement, which results in wearing out of the surfaces of the other clutch member and of the balls, and produces unpleasant frictional noise.

SUMMARY OF THE INVENTION

A primary object of this invention is therefore to provide an overload release clutch (hereinafter simply called clutch where the situation allows), wherein a sliding movement of a torque transmitting ball or balls on one of the clutch members is eliminated while the clutch is in a disconnected state. An embodiment of this invention comprises a driving clutch member, a driven clutch member, at least one torque transmitting ball, at least one recess or opening formed in the mutually opposing or confronting surfaces of both clutch members for receiving the ball, or balls therein, at least one ball guiding groove or slot extending in a nearly circumferential but in a spirally manner, in either one of the mutually opposing surfaces in one of the two clutch members. One end of each such slot communicates with the recess, and a rotatable member is rotatably disposed on the surface of the other clutch member with no ball guiding groove engaging the ball when the latter has been moved to the other end of the ball guiding groove.

When an unusually large torque or load exceeding a predetermined value is applied to the driven clutch member and the torque transmitting ball (hereinafter simply called ball when the situation allows) is moved out of the opening to the other end of the ball guiding groove (hereinafter simply called groove when the situation allows), the ball moves into engagement with the rotatable member. Even under a condition where the driving clutch member alone is rotating, with the driven clutch member being restrained from movement, the ball is allowed to rotate together with the rotatable member with no sliding movement of one on the other. This completely eliminates the wearing of the clutch and the noise production otherwise arising from the earlier mentioned frictional sliding.

In another embodiment of this invention, the driving clutch member mentioned above is capable of being rotated either forward or backward, and a one-way clutch is disposed either between one clutch member, carrying a rotatable member and the rotatable member or between a stationary member such as a frame and the rotatable member, which one-way clutch allows the rotatable member to rotate in the forward direction of the driving clutch member but prevents it from rotating in the backward or reverse direction.

In the event an unusually large torque exceeding a predetermined value is applied while the driving clutch member is in rotation, the ball is moved along the groove to the other end thereof and engages the rotatable member thereby stopping power transmission.

When the driving clutch member is rotated in the backward or reverse direction in this disconnected state, the rotatable member is prevented from rotating due to the action of the one-way clutch, which consequently returns the ball back to the opening along the slot.

Another object of this invention is therefore to provide an overload release clutch wherein the wearing and the noise during the disconnected state can be prevented while the clutch members can be reconnected only by means of reversing the driving clutch member without any further special operation.

Still another object of this invention is to provide an overload release clutch which is capable of attaining the above-mentioned objects with as simple a structure as possible.

Other objects and advantages of this invention will be apparent from studying the following description in conjunction with the appended drawings and claims.

BRIEF DESCRIPTION OF THE DRAWINGS

FIG. 2 is a cross section of a part of the first embodiment taken along the line 2—2 in FIG. 1;

FIG. 3 is a cross section of another part of the embodiment taken along the line 3—3 in FIG. 1;

FIG. 4 is a partial axial section, corresponding to FIG. 1, of a second embodiment of an overload release clutch of this invention; and FIG. 5 is a cross section of a part of the second embodiment taken along the line 5—5 in FIG. 4.

DETAILED DESCRIPTION OF THE PREFERRED EMBODIMENTS

Figure 1:
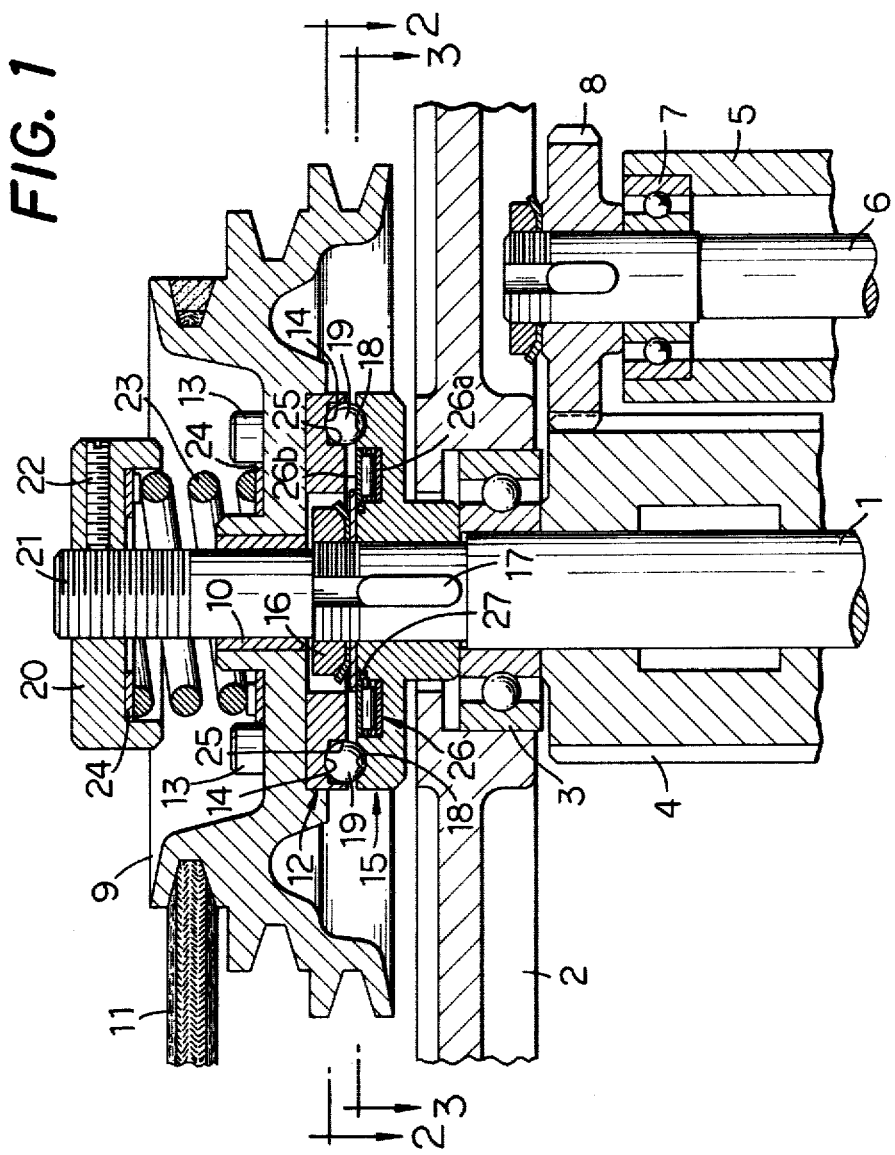
FIG. 1 is a first axial section of an embodiment of an overload release clutch of this invention.

An embodiment of the invention overload release clutch has been used in a tapping machine as described in this detailed description and the accompanying drawings.

A driven shaft 1 as can be seen in FIG. 1, is carried by a frame 2 by way of a ball bearing 3. Secured to the middle part of the driven shaft 1 is a driving spur gear 4 of large width and to the lower end thereof a not-illustrated worm is secured. A spindle sleeve 5 is also carried by the frame 2 so as to be able to move up and down along an axial line parallel to the axis of the driven shaft 1. On the external surface of the spindle sleeve 5 a rack (not shown) is formed. A spindle 6 is rotatably supported by a ball bearing 7 within the spindle sleeve 5; to the upper end of the spindle 6 a driven spur gear 8 which is engageable with the driving spur gear 4 is secured and to the lower end thereof a not-illustrated chuck is attached for holding a tap or tapping tool. In response to forward or reverse rotation of the driven shaft 1 the spindle 6 is similarly, by way of gears 4 and 8, rotated forwardly or reversely; and the spindle sleeve 5 is, via the worm and a not-shown gearing mechanism and the rack, moved up and down. The tapping tool attached to the lower end of the spindle 6 is able to perform a tapping or internal threadcutting operation with the aid of the vertical movement of the spindle sleeve 5, in a pre-bored hole.

Near the upper end of the driven shaft 1 a pulley 9, via a bearing metal 10, is mounted so that it is rotable relative to and also movable axially of, the shaft 1. The pulley 9 and another pulley on a motor shaft (not shown) are connected by a belt 11, which permits both pulleys to be rotated in forward or reverse directions by a two-way rotatable motor (not shown). Between the pulley 9 and the driven shaft 1 an overload release clutch is disposed, which transmits a rotational torque from the pulley 9 to the driven shaft 1 in a suspendable or disconnectable manner.

The structure of the overload release clutch will be described in detail. A driving clutch member 12 is secured, so as to be forwardly or reversely rotatable about the driven shaft 1 integrally with the pulley 9, to one side of the pulley 9 in the central portion thereof with four bolts 13. In the operative face of the driving clutch member 12 four spherical openings or recesses 14 are formed along a circle with an equal angular spacing from one to the other, as shown in FIGS. 1 and 2. Beneath the driving clutch member 12 a driven clutch member 15 of substantially circular plate form is desposed so that the two members 12 and 15 face each other. Member 15 is connected to the driven shaft 1 with a nut 16 and a key 17 in an integrally rotatable manner. In the upper surface of the driven clutch member 15, which faces the driving clutch member 12, four spherical openings 18 are formed as illustrated in FIGS. 1 and 3, along a circle with an equal angular spacing from one to the other so that they oppose the above-mentioned spherical openings 14.

Between the two opposing inside surfaces of both clutch members 12, 15 four torque transmitting balls 19 are interposed as to engage the respective spherical openings 14, 18 in both clutch members 12, 15. On a threaded portion 21 at the upper end of the driven shaft 1 is an adjusting nut 20, which can be fixed at a certain preset position on the driven shaft 1 with a set screw 22. Between the adjusting nut 20 and the pulley 9 is a compression spring 23 for urging or pressing the clutch members together. Spring 23 engages a spring seat 24, also interposed to movably urge the pulley 9 downwards with a preset spring force set by the adjusting nut 20. This causes the driving clutch member 12 to be urged against the driven clutch member 15.

In the inside or lower surface of the driving clutch member 12 four ball guiding slots or grooves 25 are formed, as shown in FIG. 2, one end 25a of which communicates with one of the spherical openings 14; and the grooves 25 extend toward the other end 25b thereof nearly circumferentially of the clutch member 12, in a slightly spiral manner, such that the distance between the groove 25 and the axis of the driven shaft 1, a common axis, is gradually decreased toward the other end 25b. In an annular groove formed in the inside surface of the driven clutch member 15, a thrust bearing 26 is disposed internally of the openings 18. A lower race 26a of the bearing 26 is secured to the driven clutch member 15 and an upper race 26b is almost flush with the inside or upper surface of the driven clutch member 15 and rotatable relative to the same. The upper race 26b of the thrust bearing 26 constitutes a rotatable member by itself. And when more than a predetermined load is applied on the driven clutch member 15 while the driving clutch member 12 is rotated in the forward direction shown with the arrow $P_1$ in FIG. 2, each torque transmitting ball 19 is moved from one end 25a to the other end 25b of the ball guiding slot 25, and thus moves out of the opening 18 whereby the ball 19 is pressed against the upper surface of the upper race 26b.

On the driven clutch member 15 an elastic spring wire member 27 is mounted internally of (nearer to the axis than) the upper race 26b of the thrust bearing 26. The wire member 27 is secured to the driven clutch member 15 at a base end thereof and a free end thereof is circumferentially extended or elongated as shown in FIG. 3 along the internal surface of the upper race 26b of the thrust bearing 26. In the internal surface of the upper race 26b an engaging recess 28 is formed for cooperating with the wire member 27 so as to constitute a one-way clutch. The engaging recess 28 does not engage the free end of the wire member 27 while the upper race 26b is rotating in the forward direction shown with the arrow $P_1$ relatively to the driven clutch member 15, for allowing the relative rotation of the upper race 26b in the forward direction. But when the upper race 26b is relatively rotating in the reverse direction shown with the arrow $P_2$ in FIG. 3 relative to the driven clutch member 15, the engaging recess 28 engages the free end of the wire member 27 and prevents the relative rotation of the upper race 26b in the reverse direction.

Operation of an overload release clutch incorporated in a tapping machine will be described next.

FIGS. 1 through 3 show an overload release clutch wherein the clutch members 12, 15 are connected to each other with the torque transmitting balls 19 which are all in engagement with respective openings 14, 18 in the driving and driven clutch members 12, 15. If and when the not-shown motor forwardly rotates the pulley 9 and the driving clutch member 12 via the belt 11, the rotational torque is transmitted through the balls to the driven clutch member 15 for rotating the same and the driven shaft 1 in the similar forward direction. This forward rotation of the driven shaft 1 causes a rotation of the spindle 6 through meshing of the driving spur gear 4 and the driven spur gear 8. The spindle sleeve 5 is descended toward the work with the aid of the movement of the not-shown worm, gearing mechanism and rack. The tap (tapping tool) attached to the lower tip of the spindle 6 executes a tapping operation in a pre-bored hole in the work by means of the above-mentioned cooperation of various parts. When the motor rotation is subsequently reversed, the driven shaft 1 is also reversely rotated through the clutch members 12, 15, followed by a reverse rotation of the spindle 6 and an ascending movement of the spindle sleeve 5. The tap is lifted back outside the hole after a tapping operation cycle has been finished.

If, while the tap is advancing downwards with a rotational movement actuated by the forward rotation of the driven shaft 1, the same meets an unexpectedly large rotational resistance for some reason, for example, when a pre-bored hole in the workpiece is too small in diameter or depth, and the driven clutch member 15 is subjected to more than a predetermined load or torque, the driving clutch member 12 alone will be forwardly rotated as shown with the arrow P₁ in FIG. 2, with the driven clutch member 15 being restricted from rotary movement. The torque transmitting balls 19 interposed between both clutch members will be forcibly moved respectively from one end 25a of the ball guiding slot 25 formed in the lower surface of the driving clutch member 12 to the other end 25b of the same. The ball 19 is thus moved out of the opening 18 formed in the inside surface of the driven clutch member 15 as shown with broken lines in FIG. 3 and pressed against the upper surface of the upper race 26b of the thrust bearing 26. The ball 19 and the upper race 26b of the thrust bearing 26 are forwardly rotated, while being in mutual engagement under pressure due to the forward rotation of the driving clutch member 12, in relation to the driven clutch member 15 which is kept at rest. This contributes to eliminating the wearing of the surfaces of the driven clutch member 15 and the balls 19 as well as reducing the noise otherwise arising from the friction. The disconnection of the two clutch members 12, 15 in such a preferable state is also very effective in preventing breakage or damage of the tap in the event an unusually large torque is applied thereto.

When the motor is reversed and the the driving clutch member 12 is rotated in the reverse or backward direction as shown with the arrow P₂ in FIG. 2, the engaging recess 28 in the upper race 26, shown in FIG. 3, engages the free end of the wire member 27 thereby preventing rotation of the upper race 26b relative to the driven clutch member 15 in the reverse direction. The ball 19 is therefore forced to return from the other end 25b of the ball guiding slot 25 back to the one end 25a thereof and put into engagement with the opening 18 in the inside surface of the driven clutch member 15 as shown in FIG. 3 with a solid line. The clutch members 12, 15 can be automatically, without any manual operation, returned to the torque transmittable position thereof. A reverse rotation of the driven shaft 1 under this condition will cause the tap at the lower tip of the spindle 6 to be lifted upwards away from a threaded portion of the work.

Another embodiment is shown in FIGS. 4 and 5, wherein the thrust bearing 26 is disposed externally of, i.e. farther from the common axis than, the opening 18, the ball guiding slot 25 extends nearly circumferentially out in a slightly, outwardly spiral manner such that the distance between the groove 25 and the axis of the driven shaft 1 is gradually increased from one end thereof communicating with the opening 18 to the other end thereof. The wire member 27 is, in this instance secured to the frame 2 at one end thereof and the engaging recess 28 is formed in the external surface of the upper race 26b of the thrust bearing 26. In other words, the one-way clutch is disposed between the upper race 26b, a rotatable member, and the frame 2. Since other aspects relating to the structure and operation of this embodiment are identical to the previous embodiment as previously described, no further explanation is necessary.

This invention should not be interpreted to be limited to the above-mentioned embodiments; various modifications can be made without departing from the spirit and scope of this invention. A few examples of modifications include the following hereunder.

(1) A structure wherein the driven clutch member 15 is urged against the driving clutch member 12 by an urging means.

(2) A structure wherein the ball guiding grooves 25 are formed in the surface of the driven clutch member 15 while the rotatble member is disposed on the driving clutch member.

(3) Various possible modifications or variations of the driving clutch member, the driven clutch member, the torque transmitting balls, the openings, the urging or pressing means, the ball guiding grooves, the rotatable member, the one-way clutch, etc. are within the spirit of this invention.

(4) Incorporating or applying this invention in the torque transmitting mechanism in various machines, other than the tapping machine as exemplified in the above embodiments is possible without departing from the spirit of this invention.

What is claimed is:

1. An overload release clutch comprising:
   a driving clutch member and a driven clutch member mounted on a frame for rotating about a common axis,
   pressing means for pressing either one of the two clutch members toward the other clutch member,
   at least one torque transmitting ball interposed between said clutch members,
   at least one opening formed for receiving said ball on each mutually confronting inside surface of said clutch members,
   at least one ball guiding slot formed on the inside surface of either one of said clutch members, said slot being nearly circumferentially extended from one end communicated with said opening to the other end so as to gradually change the distance thereof from said common axis, and
   a rotatable member rotatably disposed on the other of said clutch members for being engaged and rotated with said ball when said ball is placed at said the other end of said slot,
   whereby when said ball is moved from said opening to said the other end of said slot against the action of said pressing means by more than a predetermined torque possibly applied to said driven clutch member, said ball is integrally rotated with said rotatable member with no sliding.

2. An overload release clutch in accordance with claim 1, wherein said rotatable member is disposed nearer to said common axis than said opening and said ball guiding slot is formed such that the distance between the same and the common axis is gradually decreased from said one end of said slot toward said the other end of said slot.

3. An overload release clutch in accordance with claim 1, wherein said rotatable member is disposed farther from said common axis than said opening and said ball guiding slot is formed such that the distance between the same and the common axis is gradually increased from said one end of said slot toward said the other end of said slot.

4. An overload release clutch in accordance with claim 1, wherein said rotatable member consists of a race of a thrust bearing which comprises a pair of races smoothly rotatable to each other and is disposed in an annular groove formed on the inside surface of said the other clutch member, one of said pair of races being substantially aligned with the inside surface of said the other clutch member for constituting said rotatable member, and the other of said pair of races being fixedly disposed at the bottom of said annular groove.

5. An overload release clutch comprising:
a driving clutch member and a driven clutch member mounted on a frame for being forwardly and backwardly rotatable about a common axis,
pressing means for pressing either one of the two clutch members toward the other clutch member,
at least one torque transmitting ball interposed between said clutch members,
each inside surface of said clutch members being provided with at least one opening for receiving said ball,
at least one ball guiding slot formed on the inside surface of said driving clutch member, said slot nearly circumferentially extending from said opening in the backward rotating direction of said driving clutch member so as to change the distance thereof from said common axis,
a rotatable member disposed on the inside surface of said driven clutch member so as to engage and rotate with said ball when said ball is placed at said the other end of said slot, and
one-way clutch for allowing the forward rotation of said rotatable member and preventing the backward rotation thereof,
thereby said ball is moved from said opening to the end portion of said slot against the action of said pressing means and is integrally rotated with said rotatable member with no sliding when more than a predetermined torque is applied to said driven clutch member during the forward rotation of said driving clutch member, and then said ball is returned from the end portion of said slot to said opening when said driving clutch member is rotated in the backward direction.

6. An overload release clutch in accordance with claim 5, wherein said one-way clutch is disposed between said rotatable member and said driven clutch member.

7. An overload release clutch in accordance with claim 5, wherein said one-way clutch is disposed between said rotatable member and said frame.

8. An overload release clutch in accordance with claim 5, wherein said rotatable member consists of a race of a thrust bearing which comprises a pair of races smoothly rotatable to each other and is disposed in an annular groove formed on the inside surface of said driven clutch member, one of said pair of races being substantially aligned with the inside surface of said driven clutch member for constituting said rotatable member, and the other of said pair of races being fixedly disposed at the bottom of said annular groove, and said one-way clutch includes a wire member having one end fixed to said driven clutch member and the other end freely elongated along the internal surface of said one race, and an engaging recess formed on said internal surface to be able to engage with said the other end of said wire member for preventing the backward rotation of said one race.

9. An overload release clutch comprising:
a driven shaft rotatably mounted on a frame,
a driving clutch member rotatably mounted on said shaft and connected to a forwardly and backwardly rotatable driving source,
a driven clutch member fixed to said driven shaft,
pressing means for pressing said driving clutch member toward said driven clutch member,
a plurality of torque transmitting balls interposed between said clutch members,
each inside surface of the clutch members being provided with the same number of openings as that of said balls arranged on a same circumference for receiving each of said balls,
a plurality of ball guiding slots formed on the inside surface of said driving clutch member, each of said slots being nearly circumferentially extended from one end communicated with each of said openings to the other end in the backward rotating direction of said driving clutch member so as to change the distance thereof from said common axis,
an annular groove formed on the inside surface of said driven clutch member on the nearer side to said common axis than said opening,
a thrust bearing disposed in said annular groove and having a first race and a second race smoothly rotatable to each other, said first race being substantially aligned with the inside surface of said driven clutch member and said second race being fixedly disposed at the bottom of said annular groove, and
one-way clutch disposed between said driven clutch member and said first race to allow the forward rotation of said first race and to prevent the backward rotation thereof,
thereby each of said balls is moved from each of said openings to said the other end of each of said slots against the action of said pressing means and is integrally rotated with said first race with no sliding when more than a predetermined torque is applied to said driven clutch member during the forward rotation of said driving clutch member, and then each of said balls is returned from said the other end of each of said slots to each of said openings when said driving clutch member is rotated to backward direction.

* * * * *